Oct. 17, 1961 J. SEMONEIT 3,004,461
DEVICE FOR AIDING STUDENTS OF STRINGED INSTRUMENTS
Filed Jan. 19, 1960 2 Sheets-Sheet 1
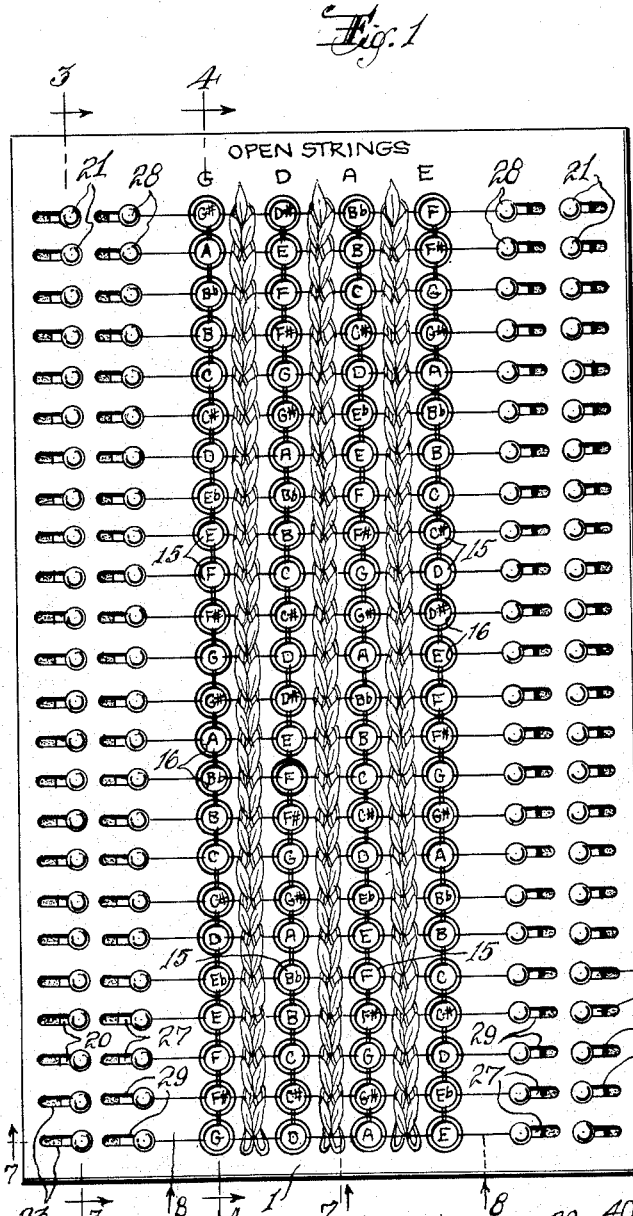
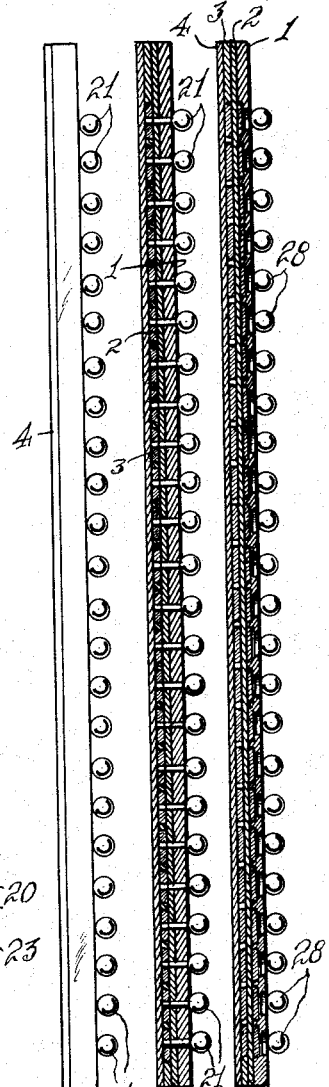

Oct. 17, 1961 J. SEMONEIT 3,004,461
DEVICE FOR AIDING STUDENTS OF STRINGED INSTRUMENTS
Filed Jan. 19, 1960 2 Sheets-Sheet 2
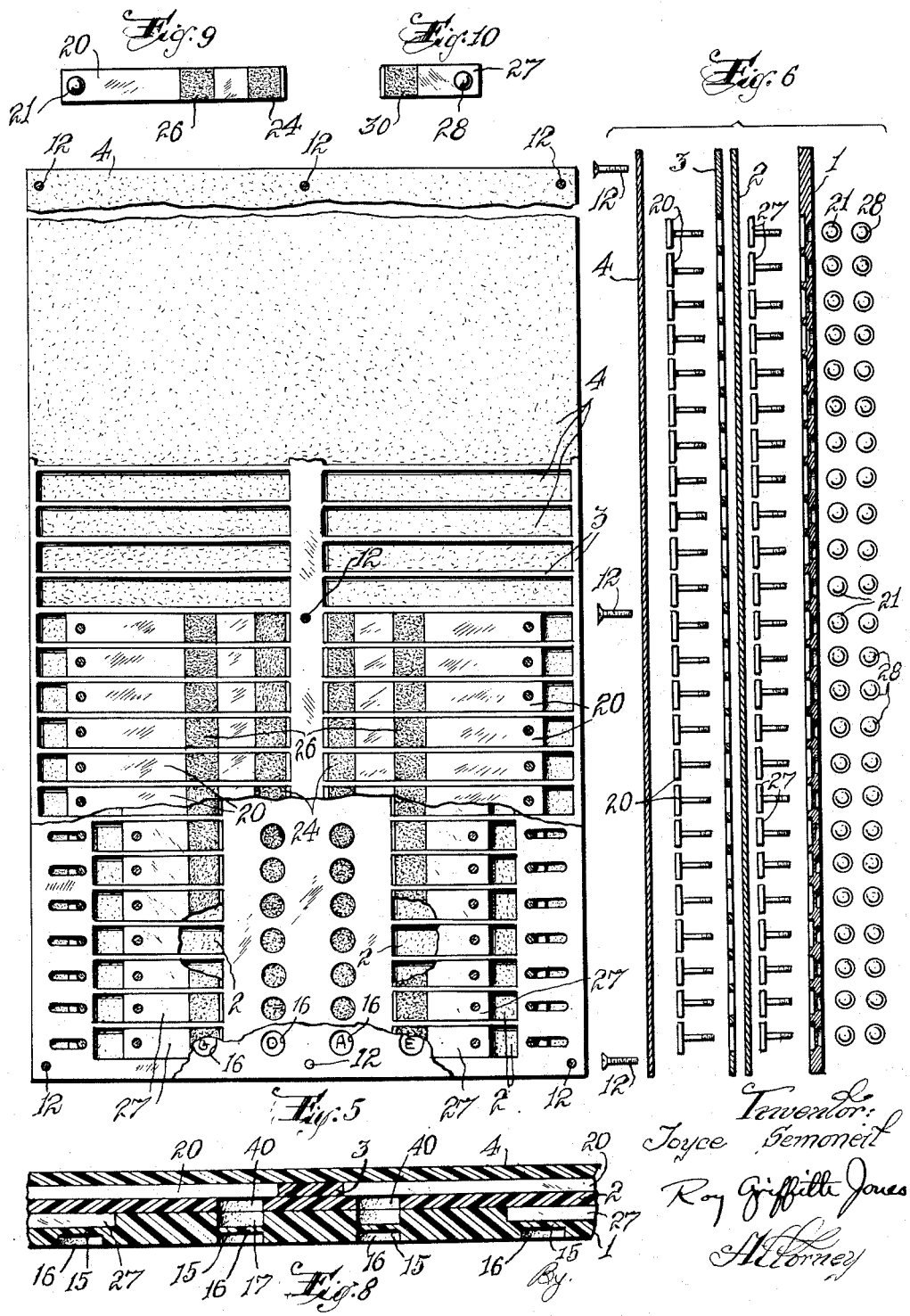

United States Patent Office 3,004,461
Patented Oct. 17, 1961

3,004,461
DEVICE FOR AIDING STUDENTS OF STRINGED INSTRUMENTS
Joyce Semoneit, 357 Portia St., South Amboy, N.J.
Filed Jan. 19, 1960, Ser. No. 3,431
1 Claim. (Cl. 84—470)

This invention relates to a device adapted to aid students in learning the fingering of stringed instruments, and by construction and use has been found to greatly reduce the time usually necessary for beginners to master the fingering of the strings.

The device comprises movable indicators, preferably each with a color spot, which show the position to be fingered on each string to produce a given tone. In more detail, the device comprises several columns of spaced apertures with each column representing one of several strings, the openings exposing indicia designating the tone produced on the respective strings when fingered at the respective indicia. The indicators may be slides, one provided for each of the openings in each column, and preferably having a color spot to be brought into view to visibly indicate the finger position for the desired tone or note on each string, the visible color spots thus clearly distinguishing the indicated finger positions from all other positions.

The device is a composite, multi-layer structure, with indicators slidable between layers and arranged compactly and adapted for the purpose stated.

The drawings illustrate the invention, and in these:
FIGURE 1 is a plan view of the device;
FIG. 2 is a side view of FIG. 1;
FIG. 3 is a sectional view taken on line 3—3 of FIG. 1;
FIG. 4 is a sectional view taken on line 4—4 of FIG. 1;
FIG. 5 is a plan view, with layers broken away to show the construction of the device;
FIG. 6 shows certain components of the device in an exploded sectional view;
FIG. 7 is an enlarged sectional view on broken line 7—7 of FIG. 1;
FIG. 8 is an enlarged sectional view on line 8—8 of FIG. 1;
FIGS. 9 and 10 are plan views of long and short slides respectively which are part of the device.

Referring to the drawings for a detailed description, the numerals 1, 2, 3 and 4 designate respectively a front sheet, a shield, a grid and a back sheet, all held together by screws 12, and all opaque except certain areas of front sheet 1. The latter sheet is preferably of a transparent material, as a synthetic plastic, for example, but is coated to make it opaque, except for certain depressed portions 15 on which indicia appears, the depressed portions remaining transparent so that colored portions of the slides, hereinafter described, may be visible through said transparent portions, adjacent the indicia thereon. Said portions 15 are preferably but not necessarily depressed, and are formed intermediate the surface of the front sheet by making recesses in the surfaces of that sheet, as recesses 16 and 17. Said depressed portions and the indicia thereon are arranged in columns, the indicia indicating the relative positions on the strings which, when fingered at such positions, produce the indicated tone on the respective strings, said columns being designated by letters representing the different strings of a musical instrument, as G, D, A and E.

FIG. 9 shows a long slide 20 which comprises an oblong strip of material, as synthetic plastic for example, and has at one end a pin-mounted removable knob 21 and a colored area 24 at the other end. The colored area 26 shown may be disregarded for this disclosure.

FIG. 10 shows a similar but shorter slide 27 having a pin-mounted removable knob 28 and a colored area 30. The short slides are movable in recesses 35 (FIG. 7) which are formed in the rear face of front sheet 1, these recesses being longer than the slides, the latter movable so that the colored area may be moved to and from the indicia of the outer of said columns G and E. Recesses 23 and 29 in sheet 1 (FIG. 7) are provided for movement of the pins on which the knobs are mounted. The long slides 20 are movable in slots 37 (FIG. 7) of the grid 3, said slots also being longer than these slides, so that the colored area 24 may be moved to and from the indicia of the inner columns D and A. Apertures 40 (FIG. 7) are formed in the front face of shield 2, opposite recesses 15 and 17, so that the colored areas of the long slides may be seen when such slides are pushed inwardly, as seen in FIG. 7, and apertures 41 are formed in the shield 2 for movement of the pins of the long slides. The shield 2 forms a backing for the short slides and the back 4 forms a backing for the long slides.

The device may be reduced considerably in size from that shown in the drawings, and provision may be made for representing more than four strings. Other changes may be made without departing from the inventive concept.

What is claimed is:

A device for aiding instruction in music, comprising front, shield, grid and back sheets in the order stated, said front and grid sheets having horizontal end-closed slots, slides laterally movable in said slots, said front sheet having aligned transparent areas arranged in a plurality of parallel columns in the middle portion of the sheet, said slides having colored inner end portions movable into and out of registration with said transparent areas, said slides comprising a column of short slides and a column of longer slides on each side of the columns of transparent areas, said short slides movable so that their colored end portions are movable into registration with the outer columns of said transparent areas and said longer slides movable into registration with the inner columns of said transparent areas, said short slides held in place by the front and shield sheets and said longer slides held in place by the grid and back sheets, said slots being longer than said slides, means whereby said slides may be conveniently moved manually, said shield having areas opposite the transparent areas of the front sheet so that the colored end portions of the longer slides may be visible, indicia of musical notes on said transparent areas of the front sheet, indicating the relative positions on the strings of a musical instrument which, when fingered, produce the indicated note, and each column of the transparent areas representing different strings of a musical instrument.

References Cited in the file of this patent
UNITED STATES PATENTS

| | | |
|---|---|---|
| 2,207,639 | Schrems | July 9, 1940 |
| 2,413,592 | Strother | Dec. 31, 1946 |
| 2,941,312 | Mattucci | June 21, 1960 |